Sept. 9, 1924.

O. K. HASELAU

COOKING UTENSIL

Filed Oct. 25, 1923

1,507,917

2 Sheets-Sheet 1

Inventor
Otto K. Haselau
By his Attorneys
Ward, Crosby & Smith

Sept. 9, 1924.

O. K. HASELAU 1,507,917

COOKING UTENSIL

Filed Oct. 25, 1923          2 Sheets-Sheet 2

Inventor
Otto K. Haselau
By his Attorneys
Ward, Crosby & Smith

Patented Sept. 9, 1924.

1,507,917

UNITED STATES PATENT OFFICE.

OTTO K. HASELAU, OF NEW YORK, N. Y.

COOKING UTENSIL.

Application filed October 25, 1923. Serial No. 670,645.

*To all whom it may concern:*

Be it known that I, OTTO K. HASELAU, a citizen of the United States, and resident of New York city, in the county and State of New York, have invented certain new and useful Improvements in Cooking Utensils, of which the following is a specification.

Figure 1:
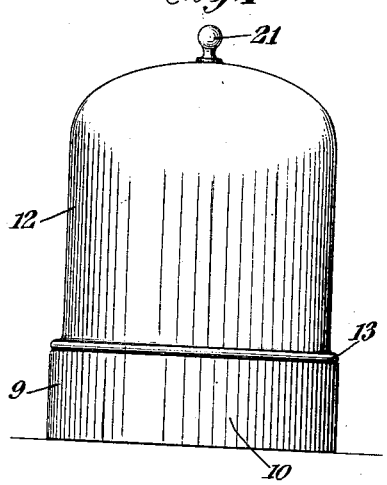
Figure 3:
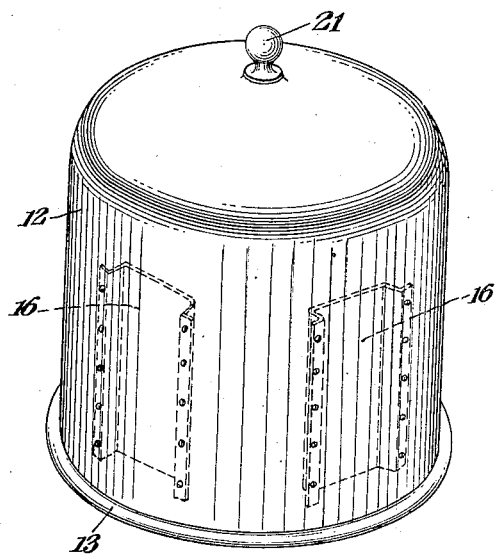
Figure 2:
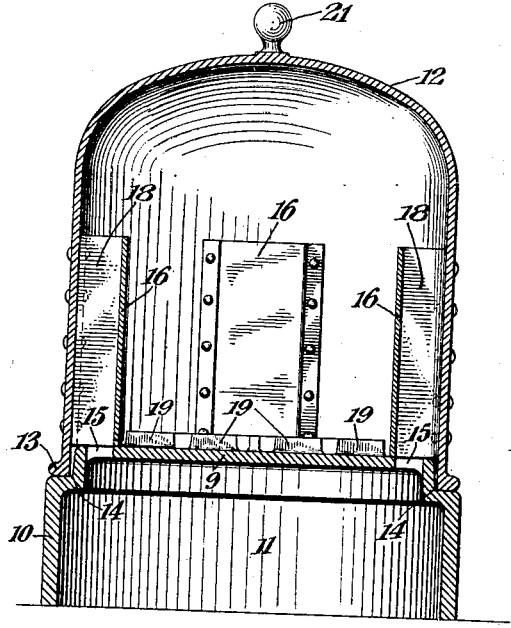
Figure 4:
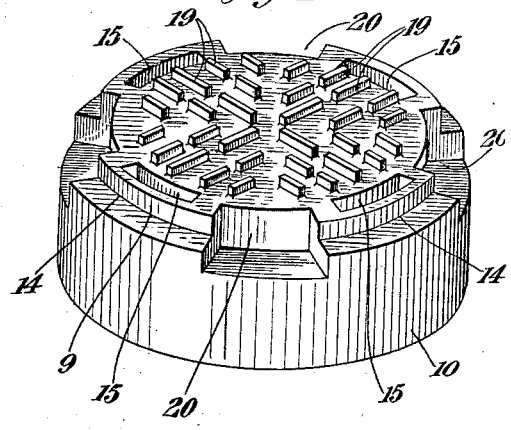
Figure 5:
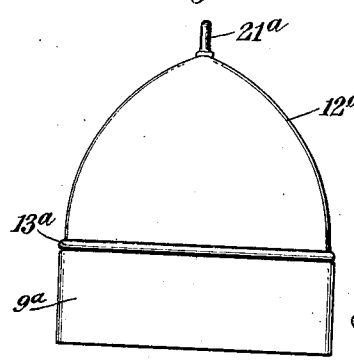
Figure 7:
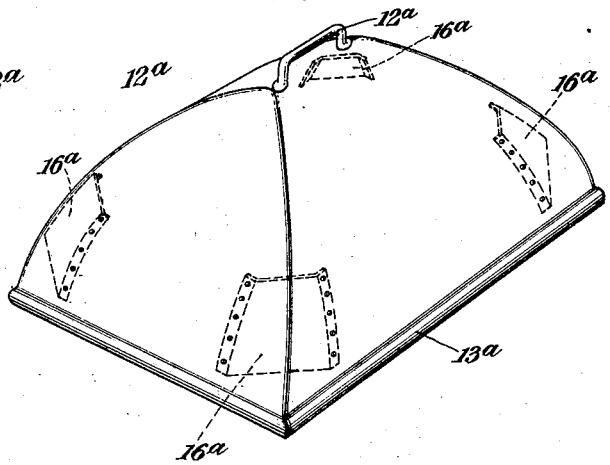
Figure 6:
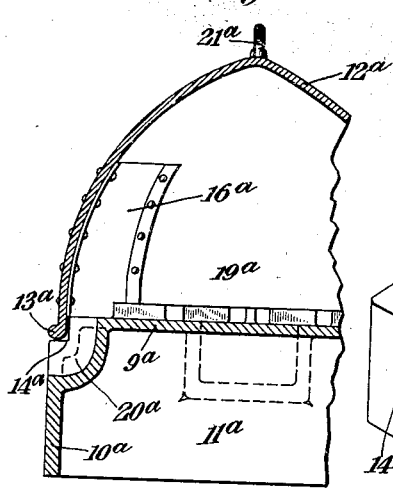
Figure 8:
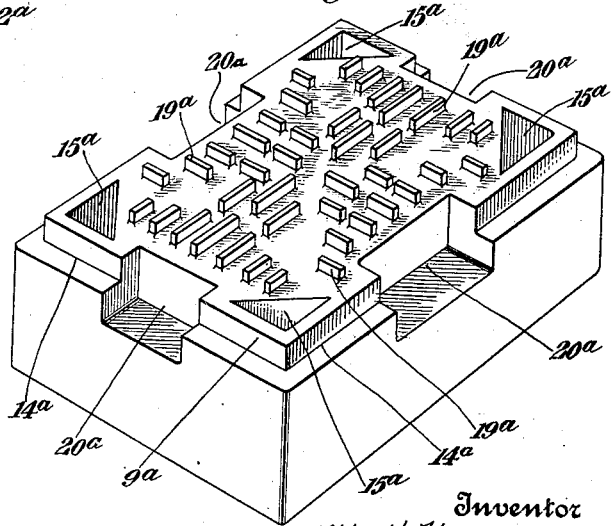

My invention relates to improvements in cooking utensils and more particularly to simple cooking utensils adapted to bake or cook potatoes and other foods. The main object of the invention is to provide a simple and efficient arrangement which is not only economical in use but may be easily and cheaply manufactured. Further and more specific objects, features and advantages will more clearly appear from the detailed description given below taken in connection with the accompanying sheets of drawings which form a part of this specification. Referring to the drawings, Fig. 1 is a side view of a utensil embodying my improvements in one form. Fig. 2 is a vertical section through the same. Fig. 3 is a perspective of the cover thereof. Fig. 4 is a perspective of the bottom plate thereof. Fig. 5 is a view similar to Fig. 1 illustrating a modified form. Fig. 6 is a vertical section of the same partly broken away. Fig. 7 is a perspective of the cover thereof, and Fig. 8 is a perspective of the bottom plate thereof.

Referring to Figs. 1 to 4, 9 represents a plate which may be made of cast iron or stamped out of sheet metal or constructed in any other suitable manner. As shown the plate is provided with a peripheral downwardly extending flange 10 forming a recess 11 on its underneath side. The plate is adapted to be set over the burner of a gas stove or other stove whereby the hot gases collect in the space 11. 12 represents a cover for the plate, the lower peripheral edge of which at 13 is adapted to fit in a rabbet or groove 14 extending around the upper edge of the plate 9. The plate 9 is provided with a plurality of apertures 15 extending therethrough from the underneath side thereof, these apertures being spaced about plate adjacent the outer edge thereof. Bolted to the inside of the cover 12 are stamped metal channel members 16 so constructed and secured to the cover member 12 as to form upwardly extending passageways 18, the bottoms of which passageways register with the aperture 15 respectively and the tops of which passageways 18 are located well up in the cover whereby the hot gases are conducted through the apertures 15 and upwardly through the passageways 18 to the upper portion of the space underneath the cover. The cover being closed at its top, the gases are caused to circulate downwardly about the material to be cooked on the plate on the cover. The plate is provided with integral upwardly extending ribs 19 on which the potatoes or other materials to be cooked may rest in order to space the same from the main top face of the plate. At its outer upper edge or periphery the plate 9 is provided with recesses or cutaway portions at 20 so as to form spaces between the plate 9 and the cover 12 and underneath the lower edge of the cover for the escape of the hot gases. The cover is shown as provided with a suitable knob or handle 21 by means of which it may be easily removed from the plate.

In operation the plate 9 is placed over the burner of a gas stove or other heating device, the material such as potatoes to be baked or other material to be cooked is placed upon the top of the plate upon the ribs 19, the cover is then put in place as shown in Figs. 1 and 2, whereupon the hot gases collect in the recess 11 and flow upwardly through the apertures 15 and passageways 18 and are caused to circulate downwardly about the material to be cooked on the plate on the cover and finally escape through the recesses 20 underneath the cover. The recesses 20 are arranged alternately with respect to the apertures 15 in order that the heating of the material to be cooked may be more uniform.

Referring to Figs. 5, 6, 7 and 8 the arrangement there shown is substantially the same except that the utensil is of general rectangular shape instead of being circular in shape or cylindrical in shape as shown in Figs. 1 and 4. In the arrangement shown in Figs. 5, to 8 inclusive the plate is indicated at $9^a$ with its flanges at $10^a$, the recess on the underneath side of the plate being indicated at $11^a$. The cover is indicated at $12^a$, and its lower edge $13^a$ is shown as fitting within the rabbet or groove $14^a$. The apertures extending up through the bottom of the plate from the underneath side thereof are indicated at 15ª. The sheet metal members 16ª which are bolted to the cover at the corners thereof form upwardly extending passageways on the inside of the corners of the cover, the lower ends of which passageways register respectively with the apertures 15ª. 19ª represent the ribs on the top of the plate and 20ª represent the recesses or cutaway portions at the ends and sides of the plate at the outer upper edge thereof forming spaces between the plate and the cover for the exit of the hot gases. The cover 12ª is shown as provided with a suitable handle 21ª by means of which the cover is easily removed from the plate and replaced thereon. The operation of the arrangement shown in Figs. 5, 6, 7 and 8 is substantially the same as the operation of the arrangement shown in Figs. 1 to 4 inclusive.

While I have described my improvements in great detail and with respect to certain preferred forms thereof, I do not desire to be limited to such details or forms since many changes and modifications may be made and the invention embodied in widely different forms without departing from the spirit and scope thereof in its broader aspects. I, therefore, desire to cover all changes and forms coming within the scope of any one or more of the appended claims.

What I claim as new and desire to secure by Letters Patent is:

1. A cooking utensil comprising a plate adapted to be placed on a heating device, said plate being apertured to permit the hot gases to pass through the plate from the underneath side thereof, and a removable cover adapted to fit on the top of said plate, said cover having a passageway formed therein, the bottom of which passageway registers with the aperture through the plate and the top of which passageway is located well up in the cover, whereby the hot gases are conducted through said passageway to the upper portion of the space underneath the cover and are caused to circulate downwardly about material to be cooked on the plate under the cover.

2. A cooking utensil comprising a plate recessed on its underneath side to form a space for hot gases, said plate being apertured to permit the hot gases to pass through the plate from the underneath side thereof, and a removable cover adapted to fit on the top of said plate, said cover having a passageway formed therein, the bottom of which passageway registers with the aperture through the plate and the top of which passageway is located well up in the cover, whereby the hot gases are conducted through said passageway to the upper portion of the space underneath the cover and are caused to circulate downwardly about material to be cooked on the plate under the cover, a space being provided between the plate and the cover at the outer edge thereof for the escape of the hot gases.

3. A cooking utensil comprising a plate adapted to be placed on a heating device, said plate being apertured to permit the hot gases to pass through the plate from the underneath side thereof, and a removable cover adapted to fit on the top of said plate, said cover having a passageway formed therein, the bottom of which passageway registers with the aperture through the plate and the top of which passageway is located well up in the cover, whereby the hot gases are conducted through said passageway to the upper portion of the space underneath the cover and are caused to circulate downwardly about material to be cooked on the plate under the cover, a space being provided below the cover for the escape of the hot gases.

4. A cooking utensil comprising a plate adapted to be placed on a heating device, said plate having a plurality of apertures therethrough spaced around the plate adjacent the outer edge thereof, said apertures permitting the hot gases to pass through the plate from the underneath side thereof, and a removable cover on the top of said plate, said cover having a plurality of upwardly extending passageways, formed therein, the bottom of which passageways register with said apertures respectively, and the tops of which passageways are located well up in the cover whereby the hot gases are conducted upwardly through said passageways to the upper portion of the space underneath the cover and are caused to circulate downwardly about material being cooked on the plate underneath the cover.

5. A cooking utensil comprising a plate recessed on its underneath side to form a hot gas space, said plate having a plurality of apertures therethrough spaced around the plate adjacent the outer edge thereof, said apertures permitting the hot gases to pass through the plate from the underneath side thereof, and a removable cover on the top of said plate, said cover having a plurality of upwardly extending passageways formed therein, the bottom of which passageways register with said apertures respectively, and the tops of which passageways are located well up in the cover whereby the hot gases are conducted upwardly through said passageways to the upper portion of the space underneath the cover and are caused to circulate downwardly about material being cooked on the plate underneath the cover, a space being provided between the plate and the cover at the outer edge thereof for the escape of the gases.

6. A cooking utensil comprising a plate recessed on its underneath side to form a hot gas space, said plate having a plurality of apertures therethrough spaced around the plate adjacent the outer edge thereof, said apertures permitting the hot gases to pass through the plate from the underneath side thereof, and a removable cover on the top of said plate, said cover having a plurality of upwardly extending passageways formed therein, the bottom of which passageways register with said apertures respectively, and the tops of which passageways are located well up in the cover whereby the hot gases are conducted upwardly through said passageway to the upper portion of the space underneath the cover and are caused to circulate downwardly about the material being cooked on the plate underneath the cover, the plate having recesses in its top outer edge to provide spaces under the lower edge of the cover for the escape of the hot gases.

7. A cooking utensil comprising a plate recessed on its underneath side to form a hot gas space, said plate having a plurality of apertures therethrough spaced around the plate adjacent the outer edge thereof, said apertures permitting the hot gases to pass through the plate from the underneath side thereof, and a removable cover on the top of said plate, said cover having a plurality of upwardly extending passageways formed therein, the bottom of which passageways register with said apertures respectively, and the tops of which passageways are located well up in the cover whereby the hot gases are conducted upwardly through said passageways to the upper portion of the space underneath the cover and are caused to circulate downwardly about material being cooked on the plate underneath the cover, the plate having recesses in its top outer edge to provide spaces under the lower edge of the cover for the escape of the hot gases, said last mentioned spaces being alternately located with respect to said apertures in the plate.

8. A cooking utensil comprising a plate adapted to be placed on a heating device, said plate being apertured to permit the hot gases to pass through the plate from the underneath side thereof, and a removable cover adapted to fit on the top of said plate, whereby the hot gases are conducted through the plate and are caused to circulate in the space under the cover, a space being provided between the plate and the cover at the outer edge thereof for the escape of the hot gases.

9. A cooking utensil comprising a plate recessed on its underneath side to form a space for hot gases, said plate being apertured to permit the hot gases to pass through the plate from the underneath side thereof, and a removable cover adapted to fit on the top of said plate, whereby the hot gases are conducted through the plate and are caused to circulate in the space under the cover, said plate having a plurality of recesses in its top outer edge to provide spaces under the lower edge of the cover for the escape of the hot gases.

In testimony whereof I have signed my name to this specification.

OTTO K. HASELAU.